United States Patent
Batinli et al.

(10) Patent No.: US 6,896,315 B2
(45) Date of Patent: May 24, 2005

(54) SLIDING DOOR GUIDE CARRIAGES AND RUNNING RAILS ON MOTOR VEHICLES

(75) Inventors: Bahatni Batinli, Ludwigsburg (DE); Alexandre Doubravine, Sindelfingen (DE); Horst Rudolf, Neuhauseen/Fildern (DE); Klaus Ruigrok van de Werve, Böblingen (DE); Bernd Schäfer, Böblingen (DE); Eduard Schledovitz, Stuttgart (DE)

(73) Assignee: Invenio GmbH Engineering Services, Rüsselsheim (DE)

( * ) Notice: Subject to any disclaimer, the term of this patent is extended or adjusted under 35 U.S.C. 154(b) by 0 days.

(21) Appl. No.: 10/474,053

(22) PCT Filed: Apr. 2, 2002

(86) PCT No.: PCT/DE02/01180
§ 371 (c)(1),
(2), (4) Date: Oct. 6, 2003

(87) PCT Pub. No.: WO02/081244
PCT Pub. Date: Oct. 17, 2002

(65) Prior Publication Data
US 2004/0123524 A1 Jul. 1, 2004

(30) Foreign Application Priority Data
Apr. 5, 2001 (DE) .................................... 201 06 046 U

(51) Int. Cl.[7] .................................................. B60J 5/06
(52) U.S. Cl. ...................................................... 296/155
(58) Field of Search .............................. 296/155, 146.4; 49/323, 168, 163, 360

(56) References Cited

U.S. PATENT DOCUMENTS

| 4,646,863 A | 3/1987 | Yamada |
| 6,412,222 B1 * | 7/2002 | Hashiba et al. ............. 296/155 |

FOREIGN PATENT DOCUMENTS

| DE | 2 220 701 | 4/1972 |
| DE | 2 322 692 | 5/1973 |
| FR | 2 813 243 A1 | 8/2000 |
| GB | 1 425 800 | 2/1976 |
| JP | 12016086 | 1/2000 |

* cited by examiner

Primary Examiner—Jason Morrow
(74) Attorney, Agent, or Firm—Cohen, Pontani, Lieberman & Pavane

(57) ABSTRACT

A sliding door guide for motor vehicles, in particular vans and utility vehicles, includes an upper, lower and a central guide mechanism to hold the door in place. The door is flush with the side panel of the vehicle when closed and extends beyond the side of the side panel when open and can essentially be moved parallel to the side panel. The central guide mechanism includes a carriage and sliding rails. The sliding rails are arranged on the inside of the door, in which the carriage is hinge-mounted on a reversing lever and in turn the reversing lever is hinge-mounted on a pillar of the vehicle body. A first anchor is mounted in front of the carriage when seen in the direction of opening, and a second anchor is mounted in the side panel approximately half way along the path of opening. Together with the first anchor, this second anchor automatically activates a mechanical coupling or trap on reaching the corresponding opening positing, forming a further fixing point for the door-guide mechanism at the location of the second anchor.

23 Claims, 7 Drawing Sheets

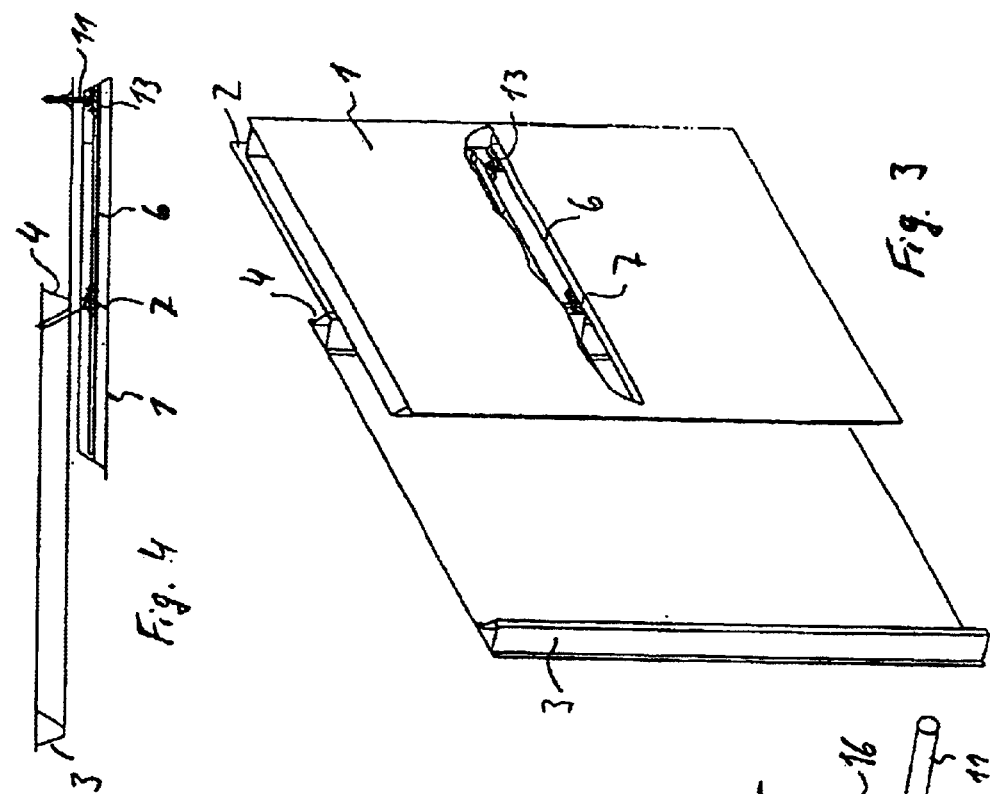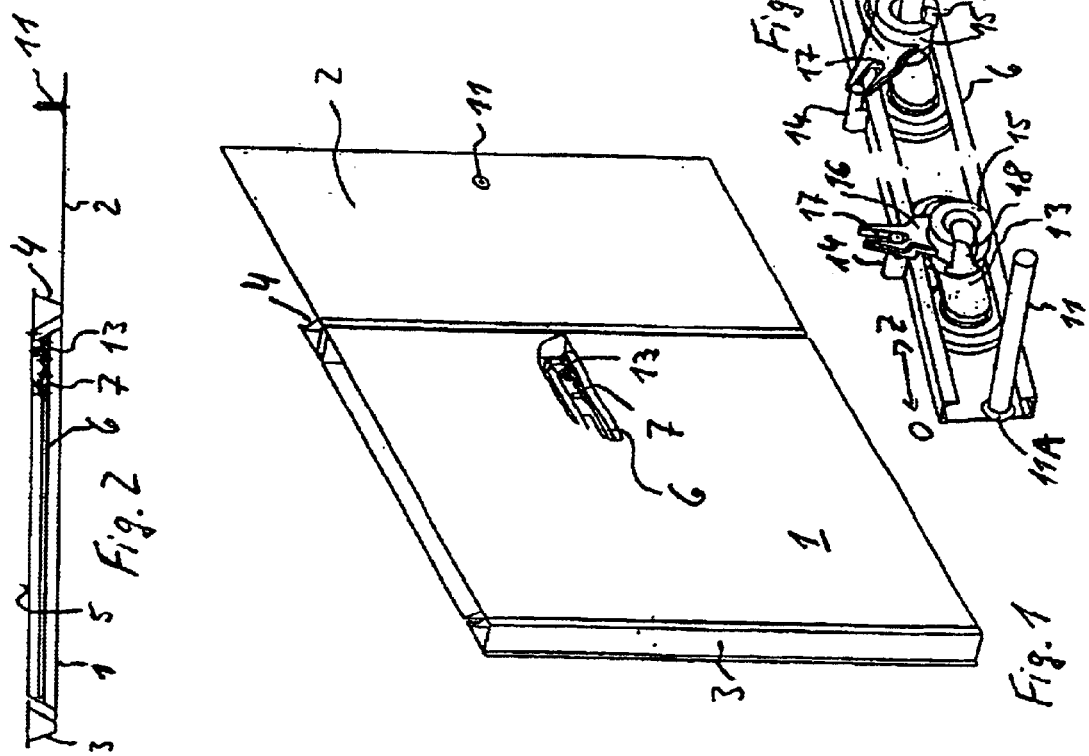

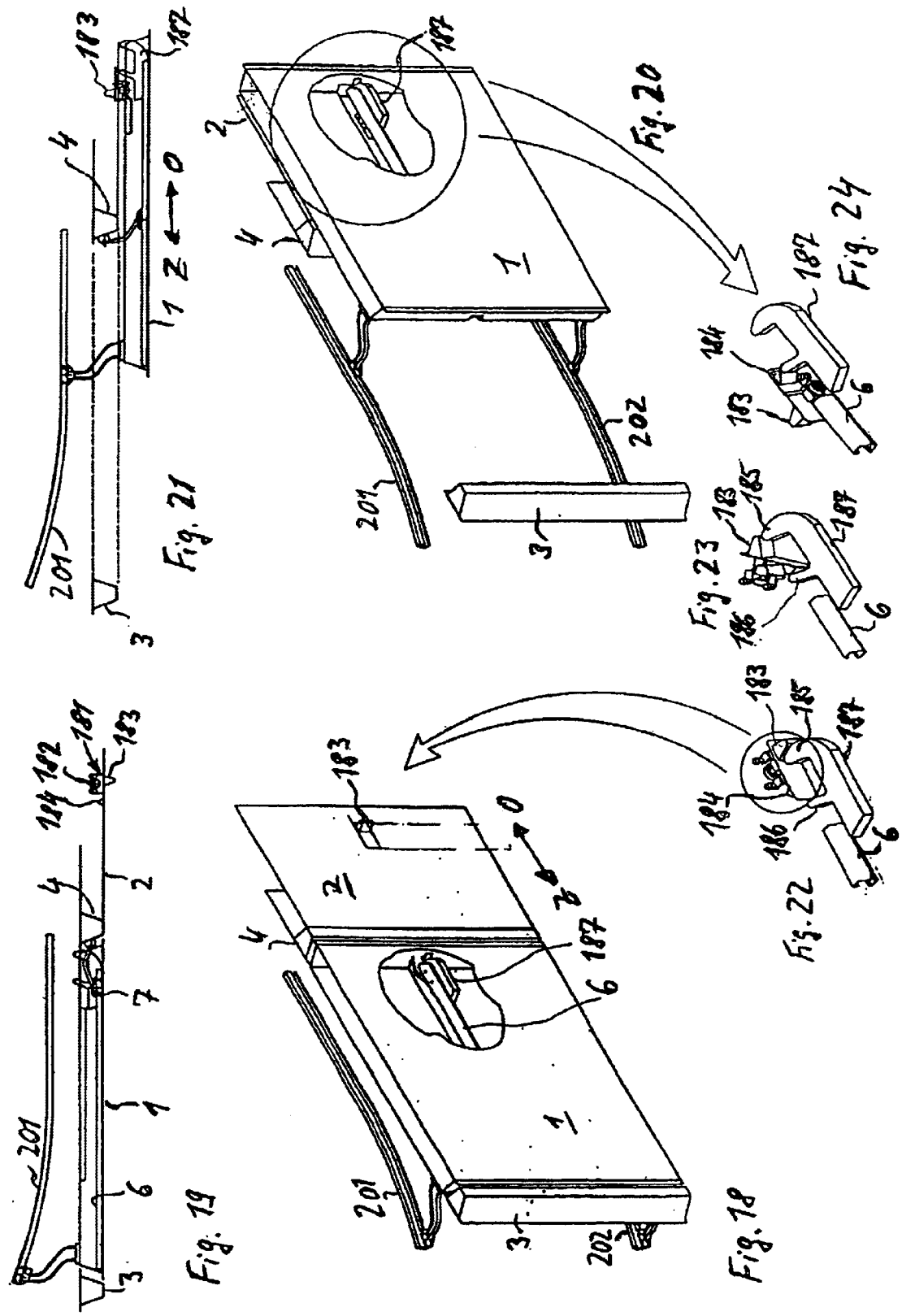

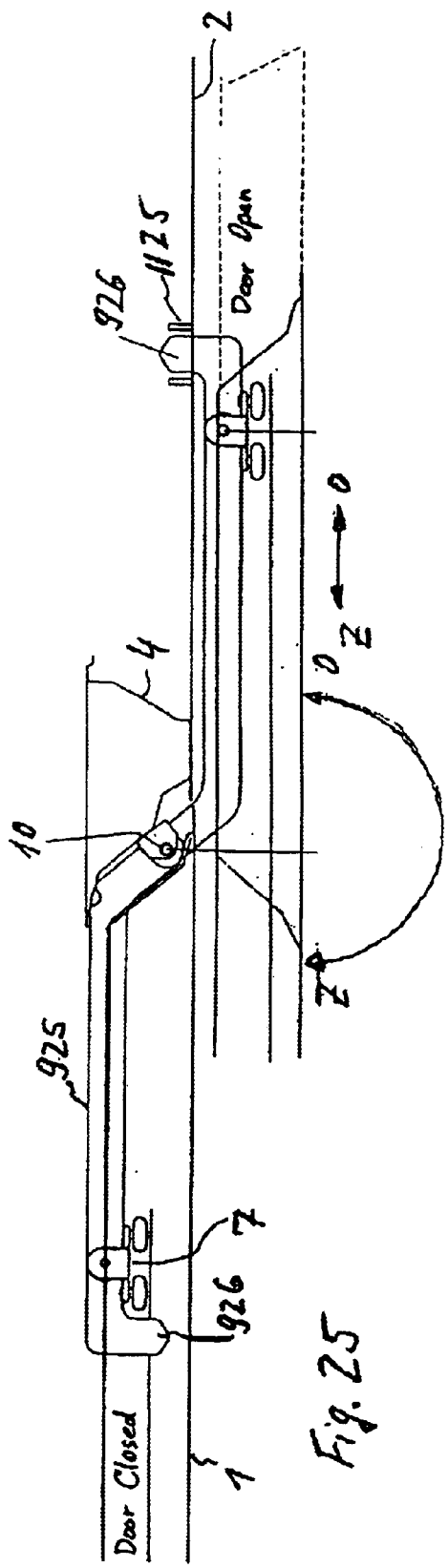
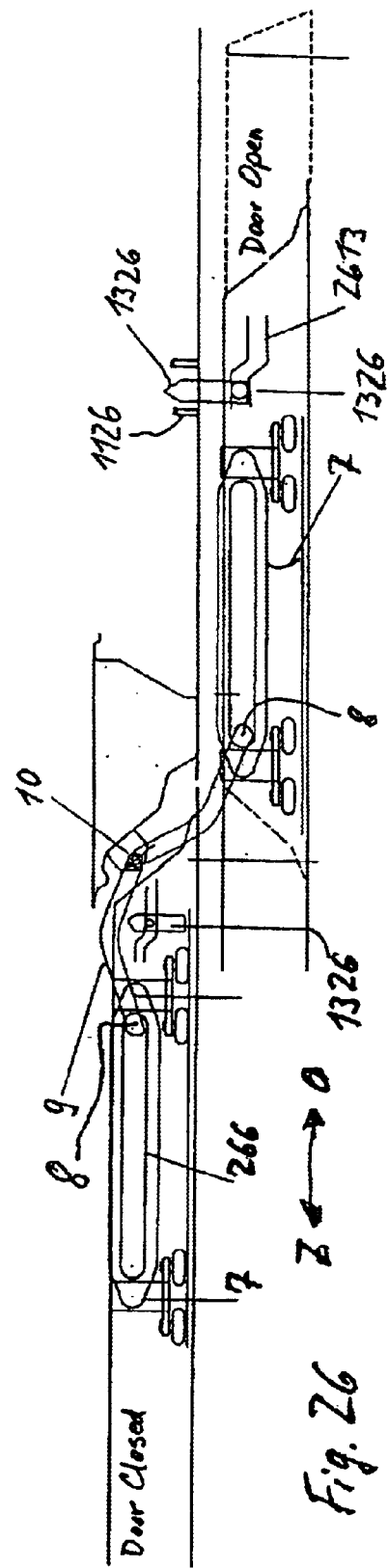

SLIDING DOOR GUIDE CARRIAGES AND RUNNING RAILS ON MOTOR VEHICLES

PRIORITY CLAIM

This is a national stage of PCT application No. PCT/DE02/01180, filed on 2 Apr. 2002. Priority is claimed on that application and on the following application(s): Country: Germany, Application No.: 201 06 046.9, Filed: 5 Apr. 2001.

BACKGROUND OF THE INVENTION

1. Field of the Invention

The invention concerns a sliding door guide for motor vehicles, in particular vans and utility vehicles, comprising carriages and sliding rails, in which an upper, lower and central rail contain the door so that the door is flush with a side panel of the motor vehicle in the closed position and extends beyond a side of the side panel when open.

2. Description of the Related Art

Sliding door guides for motor vehicles are familiar and available on the market, in particular for vans and utility vehicles, and comprise carriages and sliding rails, in which an upper, lower and central rail contain the door. In its closed position, the door slides flush with the side panel of the vehicle and in its open position the door extends outwards beyond the side panel of the vehicle. When the door opens and closes, it essentially slides parallel to the side panel.

Familiar types of sliding door guides, sliding and guide rails are generally centrally mounted on the outside of the motor vehicle's side panel, which are concealed behind the door. Other guide rails are mounted at the top and bottom of the doorway. This means that the door is held at the top, in the middle and at the bottom.

A disadvantage of this widely-used type of mounting and guide mechanism is that the sliding rails for the central guide are mounted on the outside of the vehicle. This considerably impairs the vehicle's design and appearance and moreover demands the use of a particularly expensive materials owing to the direct influence of weather conditions on the sliding rails. Rust-free steel is usually used here.

SUMMARY OF THE INVENTION

The object of the present invention is to design the familiar sliding door guide so that the expensive, unaesthetic external sliding rails are no longer required.

With respect to the state of the art, the essential advantage of the sliding door guide according to the invention is that external sliding rails are no longer required for the central guide mechanism. This provides a wealth of new opportunities for designing motor vehicles with sliding doors, not only vans and utility vehicles. It involves the following advantages, among other things. Improved absorption of the high kinetic energy; considerably improved design and/or opportunities for this in the planking of the vehicle; high 'false' forces are intercepted without resulting in high operating forces; costs are lower than or identical to the conventional solution; for example, the expensive covering of external sliding rails commonly in use today will no longer be necessary and less expensive materials can be used to manufacture the sliding rails; mounting the sliding rails on the inside of the door contributes to side-on collision protection; and both side panels of a vehicle are essentially identical.

In accordance with the invention, this is principally realised by mounting sliding rails on the inside of the door as a central guide mechanism, the carriage is hinge-mounted on a reversing lever, the reversing lever is in turn hinge-mounted on a pillar of the vehicle body, a first anchor is mounted in front of the carriage when seen in the direction of opening, a second anchor is mounted in the side panel approximately half way along the path of opening, which automatically activates a mechanical coupling or trap with the first anchor on reaching the corresponding opening position, thereby forming a further fixing point at the second anchor for the door-guide mechanism.

In accordance with an advantageous embodiment of the sliding door guide according to the invention, the second anchor is provided as a bracket extending from the side panel, and the first anchor serves the sliding rails provided on the inside of the door, which interlock with the further fixing point at the position of the extending bracket to form the encompassing door-guide mechanism. This is the simplest embodiment of the invention, although the bracket mounted to extend from the side panel indicates what could be considered as an inconvenient solution. The preferred form of this bracket would be roller or would have a roller that fits into the sliding rails at the outer end.

In accordance with a further advantageous embodiment of the sliding door guide according to the invention, a roller or a carriage comprising several rollers is provided as a second anchor, which is permanently mounted on the side panel or is mounted so that it can move or swing out of this so that it is the first anchor to serve the sliding rails mounted on the inside of the door, which interlock with the further fixing point at the roller or carriage comprising several rollers to form the encompassing door-guide mechanism. The special advantage of this embodiment is that in the case of the version that can move or swing out of the roller or carriage, an uninterrupted side panel is created when the door is closed, with the exception of a small sealable opening to move or swing out the roller or carriage, allowing a freely designed side panel.

Another advantageous embodiment is provided in accordance with a particularly advantageous sample execution of the fundamental solution according to the invention, in which the first anchor takes the form of a restraining bolt that can swing out of the side panel and in which a roller assembly is provided as the second anchor in the form of a dead roller, which is mounted to run free in the sliding rails, and in which the restraining bolt automatically activates a mechanical coupling or trap on arrival at the corresponding opening position to form a further fixing point for the door-guide mechanism at the location of the restraining bolt.

Another advantageous embodiment of this sample execution is with the restraining bolt in a retracted position and covered by a flap, which can be removed from the covering position when the restraining bolt swings outwards. The same type of cover is also possible in the case of the roller that can swing outwards or the carriage that can swing outwards. In another advantageous embodiment, the restraining bolt is fitted with a cap, which on the one hand closes off the side panel particularly tightly in a retracted position and on the other is configured particularly contact-free in its outward position in a corresponding curved projection of the sliding rails. This provides a particularly elegant solution that does not interrupt the side panel.

In accordance with a further advantageous embodiment of the sample execution of the sliding door guide according to the invention with the roller or the carriage comprising several rollers or with the restraining bolt, a forced-control mechanism is provided, with the aid of which these components can swing out of and back into the side panel, and provision is made for the forced-control mechanism to be activated when the reversing lever rotates from the closed position into the rotated-out position or vice versa.

In a further advantageous embodiment of the sliding door guide according to the invention, a provision is made in all sample executions, in which the reversing lever is spring-loaded, in particular by means of a torsion spring, which relaxes when the door swings outwards and which extends when the door swings back into position.

In an advantageous embodiment of the sample execution with the components that extend and/or swing outwards, a cable or Bowden cable or a side-rod drive is provided for the forced-control mechanism of the restraining bolt or the roller or the carriage comprising several rollers. The cable or Bowden cable or side-rod drive is then connected either directly or indirectly to the reversing lever. In another embodiment, a concealed lever connection can also be provided, which can be operated from the reversing lever, or the forced-control mechanism can be realised by a gear drive between the reversing lever and the restraining bolt or the roller or the carriage comprising several rollers. Another possible advantageous realisation is one in which the forced-control mechanism of the restraining bolt or the roller or the carriage comprising several rollers is hinge-mounted about a horizontal or vertical axis, while the rotating movement is activated by an actuating cam when the sliding door moves across it. The description and patent claims contain other advantageous possibilities.

In a further embodiment of the sliding door guide according to the invention, an extended carriage is hinge-mounted on the reversing lever and a stopping lever is hinge-mounted on the carriage as the first anchor, or an extended reversing lever is fitted with a fixed stopping lever and that a stopping lever is fixed to the carriage as the first anchor, while a slot/opening is provided in the side panel as the second anchor, into which the stopping lever automatically falls on reaching the corresponding opening position and forms a mechanical coupling or trap, thereby forming a further fixing point for the door-guide mechanism at the location of the second anchor. In this embodiment, the door can swing out with a relatively large lift and thereby reach the opening position at which the next fixing point is formed, before the actual sliding movement begins to open the door or to open it further.

In an alternative embodiment, another advantageous embodiment of the invention has an extended carriage hinge-mounted in an oblong hole on the reversing lever, with a stopping lever hinge-mounted on the carriage as the first anchor and with a slot/opening in the side panel as the second anchor, into which the stopping lever automatically falls on reaching the corresponding opening position, thereby activating a mechanical coupling or trap and forming a further fixing point for the door-guide mechanism at the location of the second anchor. This embodiment involves a less pronounced lift-out movement and the further fixing point is formed at the end of the sliding path indicated by the oblong hole. Both these embodiments require only a relatively short slot or opening in the side panel but do not require any active components in that position. All the necessary parts are installed in the door and no springs are required. No forced-control mechanism is necessary.

BRIEF DESCRIPTION OF THE DRAWINGS

The invention is described in greater detail in the following with the aid of several sample executions depicted in the diagram of the sliding door guide designed in accordance with the invention. In this case, the individual figures are as follows:

FIG. 1 perspective view of a schematic representation of an initial embodiment of the invention, in which the restraining bolt that can swing outwards is provided in the side panel, with the door closed;

FIG. 2 top view of the embodiment according to FIG. 1;

FIG. 3 perspective view of a schematic representation of an initial embodiment of the invention, in which the restraining bolt that can swing outwards is provided in the side panel, with the door approximately half open and a further fixing point established;

FIG. 4 top view of the embodiment according to FIG. 3 with the door approximately half open;

FIG. 5 perspective view of the free-running carriage in two sliding path positions depicted in the embodiment according to FIG. 1, one of which is not mechanically connected while the other is mechanically connected to the restraining bolt which has swung outwards;

FIG. 10a top view of a schematic view of a schematic representation of the configuration of the door and side panel with a roller that can swing out as the second anchor and a disconnected side-rod drive between it and the reversing lever as the forced-control mechanism to move the roller outwards or retract;

FIG. 18 perspective view, partly exposed, of a schematic representation of another embodiment of the invention, in which a roller that can swing out is mounted in the side panel, which roller is activated and swings outwards via a cam when the door slides across it;

FIG. 19 top view of the embodiment according to FIG. 18;

FIG. 20 perspective view, partly exposed, of a schematic representation of the embodiment according to FIG. 18, with the door approximately half open and coupled anchors;

FIG. 21 top view of the embodiment according to FIG. 20 with the door partly open and an established fixing point;

FIGS. 22–24 schematic representation of a perspective view of various positions of the components involved in the rotating motion of the carriage in the door and side panel according to the embodiment of FIGS. 18–21;

FIG. 25 schematic representation of a top view of another embodiment of the invention with an extended carriage with a stopping lever, which falls and locks into an opening in the side panel to form the further fixing point, and FIG. 26 schematic representation of a top view of another embodiment of the invention in which an extended carriage with a stopping lever is contained in an oblong hole, which falls and locks into an opening in the side panel to form the further fixing point.

DETAILED DESCRIPTION OF THE PRESENTLY PREFERRED EMBODIMENTS

Figure 6:
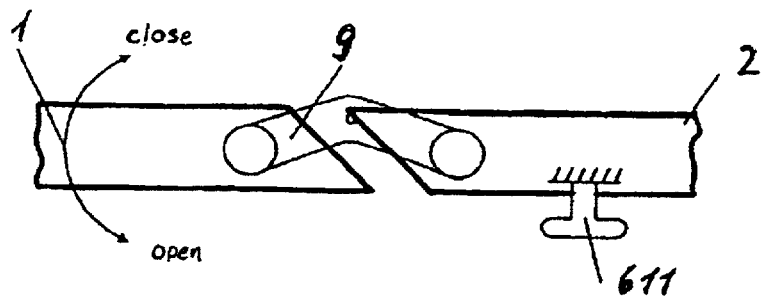
FIG. 6 top view of a schematic representation of the configuration of the door and the side panel with a fixed bracket as the second anchor.

With the aid of FIGS. 1–5, an initial embodiment is described in the following. FIG. 1 contains a perspective view of a schematic representation of the initial embodiment of the invention with sliding door 1 approximately half open or closed, as well as a side panel 2. Between two pillars 3 and 4, for example the B- and C-pillars of the utility vehicle body, door 1 closes the vehicle space behind this. According to the invention, sliding rails 6 are mounted on the inside 5 of door 1. Carriage 7 slides between these sliding rails 6. This carriage 7 can swivel about an axis and is mounted on a reversing lever 9 (see, e.g. FIG. 6). Reversing lever 9 can in turn rotate about an axis 10 an is mounted on pillar 4. Besides being contained by the central guide mechanism which is formed by sliding rails 6 and carriage 7, door 1 is also contained at the top and bottom by means of guide mechanisms between pillars 3 and 4. These top and bottom guide mechanisms are not depicted in the schematic representations of FIGS. 1–5 although they are shown in the simple execution according to FIGS. 18–21.

Figure 17:
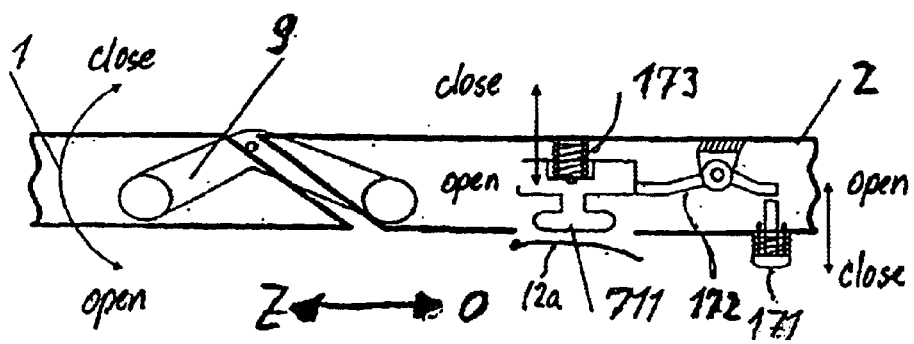
FIG. 17 top view of a schematic representation of the configuration of the door and side panel with a roller that can swing out as the second anchor and a spring-loaded engaging and disengaging lever on the outside of the side panel, which is activated when the door moves across it to move the spring-loaded roller outwards or retract it.

According to the invention, a restraining bolt 11, which can swing outwards, is provided as a second anchor in side panel 2, approximately half way along the path of opening of door 1. Restraining bolt 11 can be covered by a cap 12 (see FIG. 14), which preferably seals side panel 2 tight when restraining bolt 11 is retracted into side panel 2. A flap 12a may also be used to cover the restraining bolt as shown in FIG. 17 when the bolt is in the retracted position. The bolt will always be retracted when door 1 is closed. If door 1 is unlatched when it opens, the interlock of door 1 is not shown, the spring-loaded reversing lever 9 moves door 1 out of its position as shown in FIGS. 1 and 2 and is in the approximate position as depicted in FIGS. 3 and 4. According to this embodiment, reversing lever 9 rotates anticlockwise by slightly more than 90°. When seen in the direction of opening O, a first anchor is mounted in front carriage 7, which according to this initial embodiment comprises roller assembly 13, which is a mounted to run free between sliding rails 6. A driving pin 14, see FIG. 5 takes roller assembly 13 to the position of restraining bolt 11. On reaching the position of restraining bolt 11 as the second anchor, this automatically activates a mechanical coupling with the first anchor, in this case carriage 13, and forms a further fixing point for the door-guide mechanism in this position of the second anchor.

FIG. 5 contains a perspective view of the free-running carriage 13 in two different positions as depicted in the embodiment according to FIGS. 1–4. The left-hand position shows that carriage 13 is not mechanically connected to restraining bolt 11. The right-hand position shows carriage 13 in a mechanical coupling with restraining bolt 11 that has swung outwards. A slotted ring 15 is hinge-mounted on carriage 13 and has a fixed connection to fork-blade 16. Driving pin 14 is led into fork 17 of fork-blade 16 and is mounted on sliding rails 5. The dimensions of slot 18 of ring 15 and its internal diameter and the configuration of slot 18 of ring 15 in relation to fork-blade 16 are such that slot 18 meets restraining bolt 11 when door 1 opens. If the door opens further, carriage 13 is halted while sliding rails 5 continue to move with driving pin 14. This turns fork-blade 16 so that ring 15, fixed to this, rotates and encloses restraining bolt 11 within it. The end of restraining bolt 11 is wider so that door 1 can be fixed vertically in relation to side panel 2. The right-hand position shows restraining bolt 11 surrounded by ring 15 so that carriage 13, as the first anchor, and restraining bolt 11, as the second anchor, which has swung outwards, are interlocked. When door 1 closes, driving pin 14 automatically moves into fork 17 of fork-blade 16, rotates it until restraining bolt 11 is released, and then takes carriage 13 into the closed position.

Instead of carriage 13, which is fitted with two rollers, a single roller can also be mounted, when seen in the direction of opening O of door 1, in front of carriage 7, known as a dead roller. This also automatically creates a mechanical coupling with restraining bolt 11 when swung outwards, and forms the next fixing point for the door at the location of the restraining bolt. Other fixing points for door 1 are the connections with the top and bottom door guides according to FIGS. 18–21. This version of the invention with the individual free-running dead roller is not depicted in the figures.

FIG. 6 contains a top view of a schematic representation of a second embodiment of the invention. In this very easy to realise configuration, a fixed bracket 611 is provided as a second anchor in or on side panel 2. The end of this bracket 611 is fixed and permanently projects from side panel 2 and either takes the form of a roller or a roller can even be mounted in that position. Provision is also made in this embodiment for the first anchor that serves sliding rails 6, which are mounted on the inside of door 1, and are not shown in FIG. 6, which runs onto these at projecting bracket 611, which then forms the next fixing point for the encompassing door-guide mechanism 1. When the door opens, reversing lever 9 rotates anticlockwise about axis 10 and carriage 7 linked to this also rotates with sliding rails 6 and door 1 so that door 1 is positioned outside and approximately parallel to side panel 2, as indicated in FIG. 2. During the further opening movement, sliding rails 6 run onto bracket 611.

Figure 7:
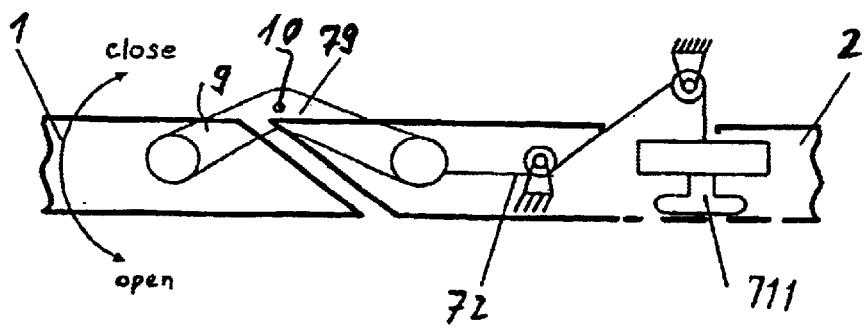
FIG. 7 top view of a schematic representation of the configuration of the door and side panel with a roller that can swing out as the second anchor and a cable between it and the reversing lever as the forced-control mechanism to move the roller outwards or retract it.

According to a third embodiment of the invention, a similar roller 711 or a carriage comprising several rollers can be used instead of the free-running roller assembly 13 or a corresponding dead roller in sliding rails 6 on the inside 5 of door 1, as shown in the schematic representation in FIG. 7. Roller 711 acts as the second anchor in this embodiment. Roller 711 or a carriage comprising several rollers as depicted in FIG. 7 can either be permanently mounted on side panel 2 or can be configured so that it can swing out of side panel 2, as depicted in FIG. 7. It is also possible to swivel-mount this roller 711 so that it can swing out of side panel 2 about a vertical or horizontal axis. In this embodiment, sliding rails 6 mounted on the inside of the door serve as the first anchor, and run onto roller 711 when the door opens, which roller has either swung outwards or permanently projects outwards. In this way, sliding rails 6 lock encompass roller 711 in this position and together they form the next fixing point for the door-guide mechanism. When the door opens, reversing lever 9 rotates anticlockwise about axis 10 and carriage 7 linked to this also rotates with sliding rails 6 and door 1 so that door 1 is positioned outside and approximately parallel to side panel 2, as indicated in FIGS. 3 and 4. When the door opens further, sliding rails 6 run onto roller 711.

In the top view of the embodiment in the schematic representation shown in FIG. 7, roller 711, which can swing outwards, is mounted in side panel 2 as the second anchor. A forced-control mechanism is provided to ensure that this second anchor always swings outwards reliably when door 1 opens and that it always returns to side panel 2 reliably when door 1 closes and the coupling releases. One example of the forced-control mechanism is realised in accordance with FIG. 7 by means of a purposely deflected cable 72, in which cable 72 is fixed on the one hand to a deflecting counterarm 79 of reversing lever 9 and on the other hand to roller 711.

Figure 8:
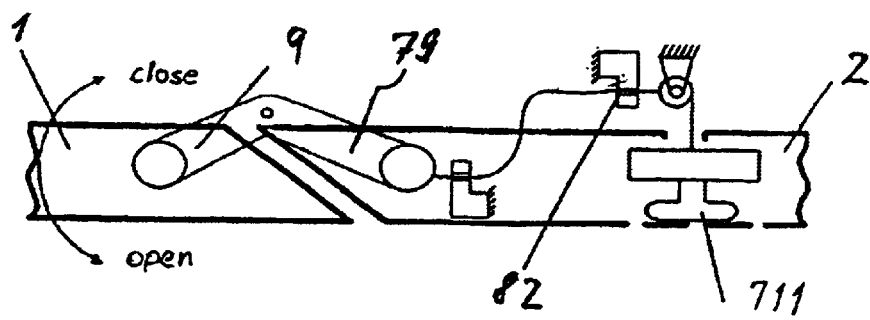
FIG. 8 top view of a schematic representation of the configuration of the door and side panel with a roller that can swing out as the second anchor and a Bowden cable between it and the reversing lever as the forced-control mechanism to move the roller outwards or retract it.

Another possibility for the forced-control mechanism of the second anchor that can swing outwards is depicted in the schematic representation of the top view in FIG. 8 by means of a Bowden cable 82. Bowden cable 82 is fixed on the one hand to deflecting counterarm 79 of reversing lever 9 and on the other hand to roller 711. Bowden cable 82 is configured so that when door 1 opens, roller 711 or in general the second anchor that can swing outwards, swings out of side panel 2 and that when door 1 closes and after the coupling releases between the two anchors, roller 711 that has swung outwards as the second anchor returns to side panel 2.

Figure 9:
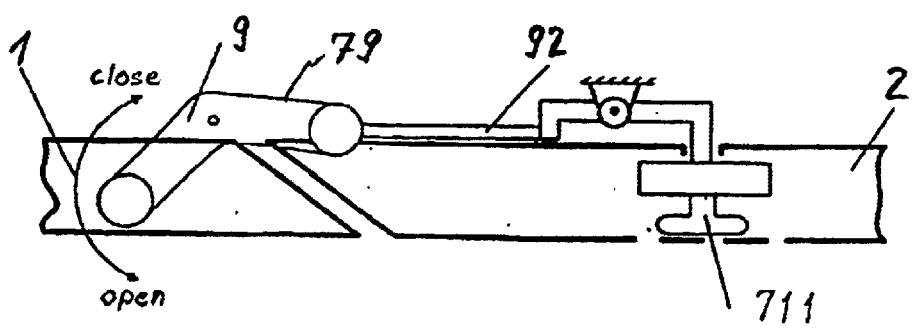
FIG. 9 top view of a schematic representation of the configuration of the door and side panel with a roller that can swing out as the second anchor and a sliding rod between it and the reversing lever as the forced-control mechanism to move the roller outwards or retract it.

The schematically represented top view in FIG. 9 shows the configuration of door 1 and side panel 2 with a roller 711 as the second anchor that can swing outwards and a sliding rod 92 between it and deflecting counterarm 79 of reversing lever 9 as a forced-control mechanism to move roller 711 outwards or retract it. In this case, sliding rod 92 at the end of deflecting counterarm 79 is linked on the one hand and on the other mounted on roller 711 via suitable deflectors.

The various forced-control mechanisms depicted in FIGS. 7 through 9, are all directly connected between reversing lever 9 and roller 711 as possible solutions for the second anchor that can swing out of side panel 2.

Figure 10A:
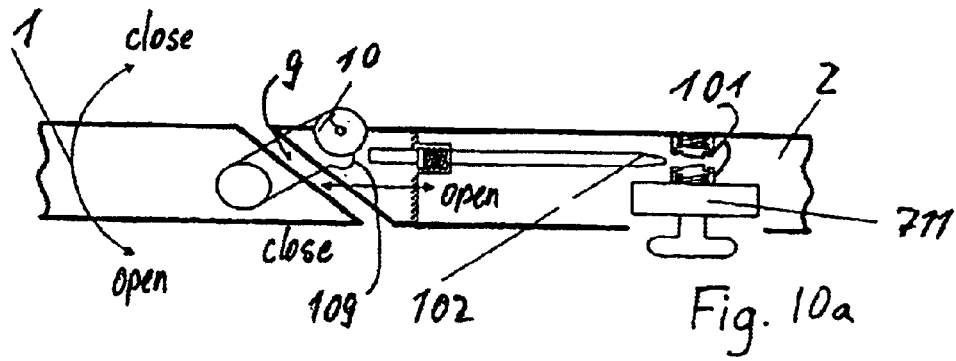
Figure 10B:
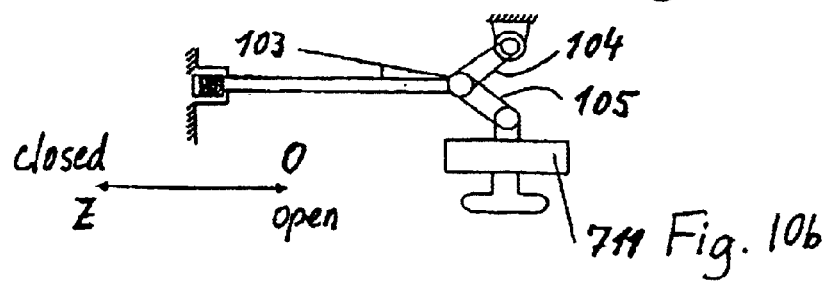
FIG. 10b is a top view of a further embodiment of the side-rod drive.

The schematically represented top view in FIG. 10 shows the configuration of door 1 and side panel 2 with a roller 711 as the second anchor that can swing outwards and a disconnected side-rod drive between it and reversing lever 9 as a forced-control mechanism to move outwards or retract roller 711, for which two versions of the side-rod drive are shown. A lug 109 is provided close to swivelling axis 10 on reversing lever 9, which can rotate about axis 10. This lug slots onto the end of a spring-loaded sliding rod 102 when door 1 opens in direction O. In the sample execution shown at the top of FIG. 10, the right-hand end of sliding rod 102 moves into a wedge device 101 when the door moves in direction O, moving roller 711 out of side panel 2. In the sample execution depicted at the bottom of FIG. 10, the right-hand end of a spring-loaded sliding rod 103 is connected to two articulated arms 102 and 105. The other end of the upper articulated arm 104 is connected flexibly to a fixed part in side panel 2. The other end of the lower articulated arm 105 is connected flexibly to roller 711. When door 1 opens in direction O, the rotation of reversing lever 9 causes the lug 109 to push sliding rod 102 to the right, which causes both ends of articulated arms 104 and 105 to move apart, moving roller 711 outwards from side panel 2. When door 1 closes in direction Z and after both anchors are disconnected, in this case sliding rails 6 and roller 711, the left-hand end of sliding rod 102 or 103 is released from lug 109 and roller 711 retracts by elastic force and returns to its original position within the side panel.

Figure 11:
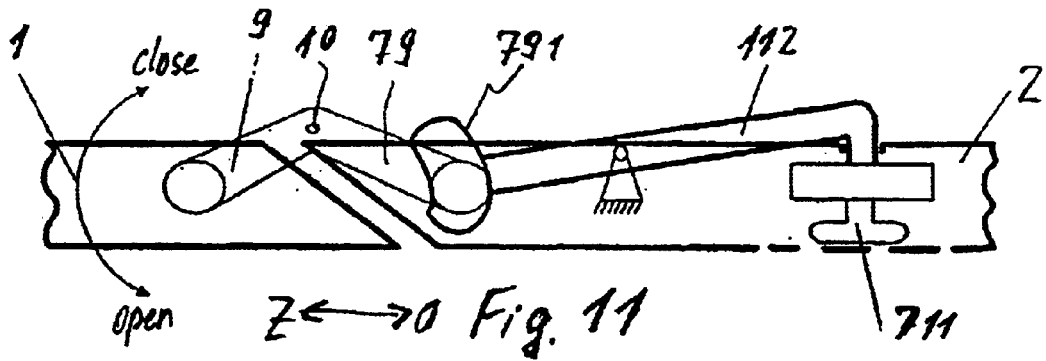
FIG. 11 top view of a schematic representation of the configuration of the door and side panel with a roller that can swing out as the second anchor and a connecting guide with a beam between it and the reversing lever as the forced-control mechanism to move the roller outwards or retract it.

FIG. 11 contains a schematic representation of another sample execution for the forced-control mechanism. The schematic representation of the top view of the configuration of door 1 and side panel 2 with roller 711 as the second anchor that can swing outwards contains a connecting guide 791 at the end of deflecting counterarm 79 and a beam 112 linked to this as a forced-control mechanism to move out or retract roller 711, in which situation roller 711 is linked to the right-hand end of beam 112.

Figure 12:
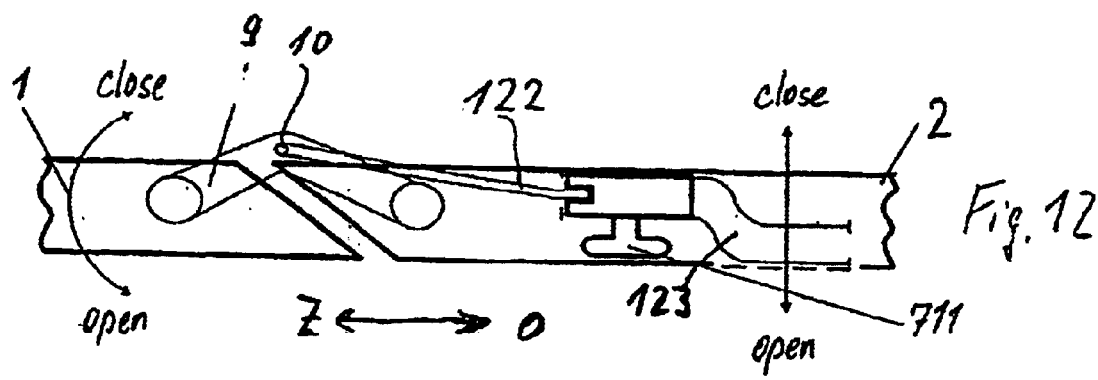
FIG. 12 top view of a schematic representation of the configuration of the door and side panel with a roller that can swing out as the second anchor and another connecting guide with an actuating beam between it and the reversing lever as the forced-control mechanism to move the roller outwards or retract it as well as a sliding guide.

FIG. 12 contains a schematic representation of another sample execution for the forced-control mechanism. The schematic representation of the top view of the configuration of door 1 and side panel 2 with roller 711 as the second anchor that can swing outwards contains a further connecting guide with actuating beam 122 between it and reversing lever 9 as a forced-control mechanism to move out or retract roller 711 together with a sliding guide 123.

Figure 13:
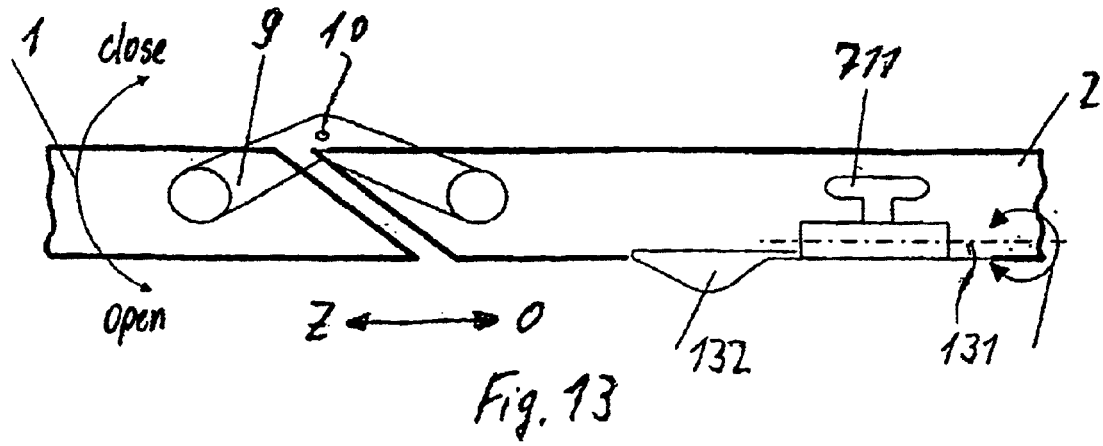
FIG. 13 top view of a schematic representation of the configuration of the door and side panel with a roller that can swing out as the second anchor and a horizontal drag bearing as a forced-control mechanism, about which the roller can rotate when swung outwards or inwards.

FIG. 13 shows the schematic representation of the top view of the configuration of door 1 and side panel 2 with carriage 711 as the second anchor that can swing outwards and another sample execution for the forced-control mechanism. To swing roller 711 out of side panel 2 or to swing it back into the side panel, it is hinge-mounted about a horizontal drag bearing with swivelling axis 131. A cam 132 is provided on the outside of rotatable roller 711 or side panel 2. If the door moves across cam 132 when it is opening or closing, roller 711 rotates in the desired direction about swivelling axis 131 and either out of or into side panel 2.

Figure 14:
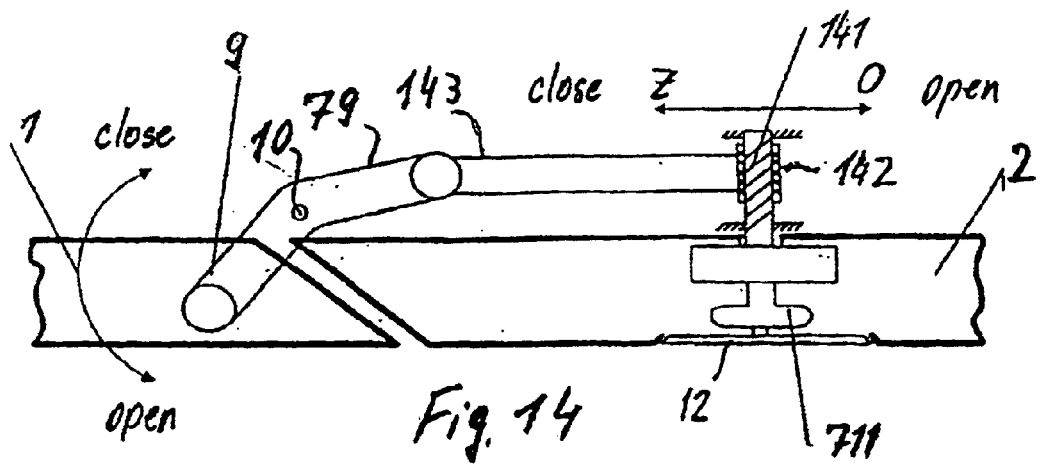
FIG. 14 top view of a schematic representation of the configuration of the door and side panel with a roller that can swing out as the second anchor and a gear drive between it and the reversing lever as the forced-control mechanism to move the roller outwards or retract it.

FIG. 14 shows the schematic representation of the top view of the configuration of door 1 and side panel 2 with roller 711 as the second anchor and a gear drive between it and reversing lever 9 or deflecting counterarm 79 mounted on this as the forced-control mechanism to move out or retract roller 711. On a screw support 141, hinge-mounted on roller 711, there is a screw socket 142, which rotates via a rod 143 for the deflector of reversing lever 9 screw socket 142 and therefore also screw support 141 and thereby swings roller 711 out of or into the side panel.

Figure 15:
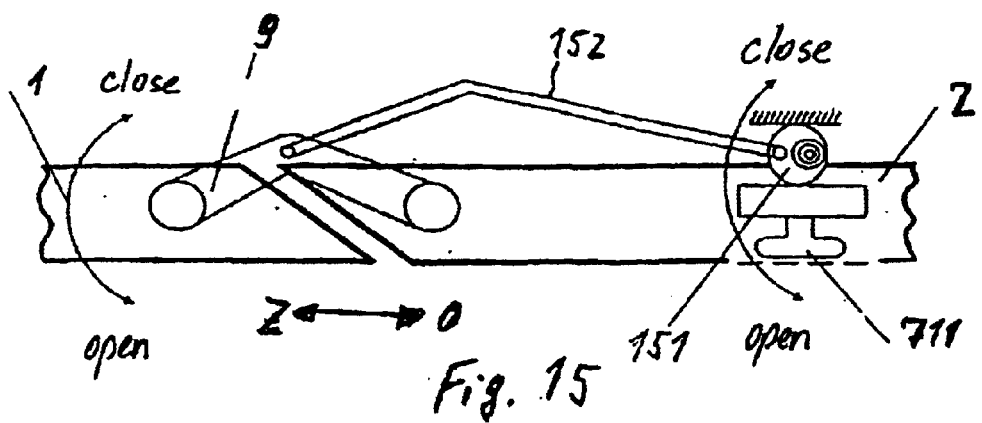
FIG. 15 top view of a schematic representation of the configuration of the door and side panel with a roller that can swing out as the second anchor and an eccentric drive between it and the reversing lever as the forced-control mechanism to move the roller outwards or retract it.

FIG. 15 shows the schematic representation of the top view of the configuration of door 1 and side panel 2 with roller 711 as the second anchor and an eccentric drive 151 between it and reversing lever 9 as a forced-control mechanism to move out or retract roller 711. The rotations of eccentric drive 151 and roller 711 mounted on it are placed in the appropriate outward or retracted position via a drive arm 152.

Figure 16:
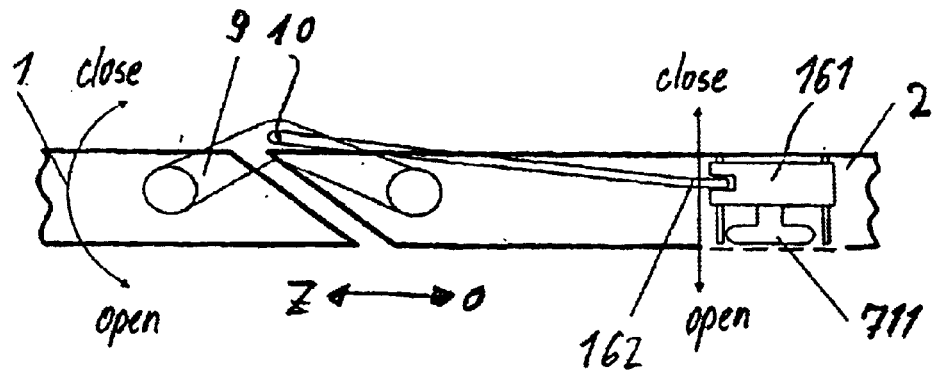
FIG. 16 top view of a schematic representation of the configuration of the door and side panel with a roller that can swing out as the second anchor and a lock, which takes the form of a rod between it and the reversing lever as the forced-control mechanism to move the roller outwards or retract it.

FIG. 16 shows the schematic representation of the top view of the configuration of door 1 and side panel 2 with roller 711 as the second anchor, in which a lock 161, which is provided via a rod 162 between it and reversing lever 9, serves as a forced-control mechanism to move out or retract roller 711.

FIG. 17 shows the schematic representation of the top view of the configuration of door 1 and side panel 2 with roller 711 as the second anchor. When the door 1 moves across it, a spring-loaded engaging and disengaging lever 171 mounted on the outside of side panel 2, triggers via a rocking lever 172 the outward movement or retraction of roller 711 by means of a vertically-loaded spring 173 with respect to side panel 2 as a forced-control mechanism.

Another embodiment of the invention is described below with the aid of FIGS. 18–24. This is schematically represented in the partly exposed perspective views of FIGS. 18 and 20, while FIGS. 19 and 21 show the top views of the respective positions of door 1 relative to side panel 2 in FIGS. 18 and 20. FIGS. 2–24 contain schematic representations of the perspective view of various positions of the components of door 1 and side panel 2 that participate in the rotation of the roller according to the embodiment of FIGS. 18–21. Upper safety rails 201 and lower safety rails 202 are depicted in FIGS. 18 and 20, which contain and guide door 1. This is in addition to the guide mechanism provided by sliding rails 6, which contains carriage 7.

In this embodiment a roller 181 that can swing outwards about a vertical axis 182 is provided in side panel 2, which roller is activated to swing outwards via a larger cam 183 on the outside of side panel 2 when door 1 moves across it while opening in direction O. On the inside of rotatable assembly 181, a smaller cam 184 is provided at a distance from larger cam 183 in the direction of movement. A claw 187 containing two projecting parts 185 and 186 is mounted on the front end of sliding rails 6 on inside 5 of door 1 when seen in direction of opening O. The distance of the projecting parts 185 and 186 in the direction of movement approximately corresponds to the distance between cams 183 und 184. When door 1 opens in direction O, projecting part 185 of claw 187 first makes contact with larger cam 183 and rotates it about the vertically swivelling axis 182. This is shown in FIG. 22. In the case of further movement in direction O, claw 187 with projecting part 185 rotates cam 183 further in the direction of side panel 2, as shown in FIG. 23. This rotation causes the smaller inner cam 184 to move outwards between projecting parts 185 and 186 of claw 187. As the door opens further, cam 184 now swings roller 181 entirely out of side panel 2, as shown in FIG. 24. Roller 181 as the second anchor swings towards sliding rails 6 as the first anchor and thereby form the next fixing point for door-guide mechanism 1. In accordance with the remaining length of the path, door 1 opens further outwards over the location of roller 181. When the door closes, roller 181 rotates inwards in reverse order from projecting parts 186 and 185 of claw 187 on cams 184 and 183 back into side panel 2.

FIG. 25 contains a schematic representation of the top view of another embodiment of the invention. In this case, carriage 7 is hinge-mounted on an extended reversing lever 925. A stopping lever 926 as the first anchor is mounted vertically on the end of reversing lever 925, when door 1 closes. An opening or slot 1125 is provided in side panel 2, which serves as the second anchor. When door 1 opens by a rotation or lift-out movement of 180° about axis 10 of reversing lever 925, stopping lever 926 grips into the corresponding opening or slot 1125, which is located at a distance from it. This position is shown on the right-hand side of FIG. 25. After this 180° rotation and the associated formation of the next fixing point for door-guide mechanism 1, this can then open further in direction O. An alternative embodiment not depicted in the figures can involve an extended carriage with a stopping lever, which locks into the opening in side panel 2 to form the next fixing point.

FIG. 26 contains a schematic representation of the top view of another embodiment of the invention. In this form, an extended carriage 7 containing an oblong hole 266 is fitted with a stopping lever 1326. An assembly that can rotate about axis 8 is mounted on reversing lever 9 in oblong hole 266. A stopping lever 1326 is mounted in front of carriage 7 in direction of opening O, which locks into an opening 1126 in side panel 2 to form the next fixing point, if door 1 rotates about axis 10 and slides into the position of opening 1126. In this case, a suitable guide mechanism 2613 moves stopping lever 1326 into opening 1126 as the second anchor to form the next fixing point. The left-hand side of FIG. 26 shows the position when door 1 is closed and the right-hand inside of FIG. 26 shows the position when door 1 is approximately half open. In accordance with the remaining path of the sliding rails, the door can open further in direction O.

The invention creates the advantageous opportunity for designing the sliding door guide for motor vehicles more elegantly, at lower cost and with a higher level of safety.

What is claimed is:

1. In a motor vehicle having a sliding door which is arranged flush with a side panel of the motor vehicle and arranged between two pillars of the motor vehicle body in a closed position and extends beyond the side of the side panel when in fully open position, the door moving essentially parallel to the side panel, a sliding door guide comprising upper, lower, and central guide mechanisms for holding the door, said central guide mechanism comprising:

sliding rails on an inside of the door;
   a reversing lever having first and second ends, the first end pivotally connected on one of the pillars of the motor vehicle;
   a carriage pivotally mounted on said second end of said reversing lever and guidably movably arranged on said sliding rails;
   a first anchor mounted in front of said carriage relative to an opening direction of the sliding door; and
   a second anchor arranged on said side panel for activating a mechanical coupling with said first anchor and forming a fixing point for said central guide mechanism when the door is moved to an opening position from said closed position, said opening position being between said closed position and said fully open position.

2. The sliding door guide of claim 1, wherein said opening position is approximately at a mid point between said closed and fully opened positions.

3. The sliding door guide of claim 1, wherein said second anchor comprises a bracket projecting from the side panel and said first anchor comprises said sliding rails, wherein said sliding rails encompass said bracket at said opening position to form said fixing point.

4. The sliding door guide of claim 1, wherein said second anchor comprises at least one roller, said second anchor being one of permanently mounted or movably mounted for moving out from the side panel, and said first anchor comprises said sliding rails, wherein said sliding rails encompass said at least one roller at said opening position to form said fixing point.

5. The sliding door guide of claim 4, further comprising a forced-control mechanism for moving said second anchor out of and into the side panel, said forced-control mechanism being activated in response to said reversing lever.

6. The sliding door guide of claim 1, wherein said second anchor comprises a restraining bolt that is movable into and out of the side panel between a retracted position and a projecting position, and said first anchor comprises one of a roller assembly or an individual roller freely movably mounted in said sliding rails, the one of a roller assembly and an individual roller activating the mechanical coupling for forming the further fixing point at the location of said restraining bolt.

7. The sliding door guide of claim 6, further comprising a forced-control mechanism for moving said second anchor out of and into the side panel, said forced-control mechanism being activated in response to said reversing lever.

8. The sliding door guide of claim 6, further comprising a flap covering said restraining bolt when said restraining bolt is in the retracted position.

9. The sliding door guide of claim 6, wherein said restraining bolt comprises a cap for tightly closing said side panel in the retracted position and does not contact the first anchor in the projecting position.

10. The sliding door of claim 1, wherein said reversing lever is spring loaded by a torsion spring which relaxes when the door moves outward from the closed position.

11. The sliding door of claim 5, wherein said force-controlled mechanism comprises one of a cable, a Bowden cable, or a sliding rod operable in response to said reversing lever for moving said second anchor into and out of the side panel.

12. The sliding door of claim 5, wherein said force-controlled mechanism comprises one of a concealed lever connection or an eccentric adjustment operable in response to said reversing lever for moving said second anchor into and out of the side panel.

13. The sliding door of claim 5, wherein said force-controlled mechanism comprises a gear drive arranged between said reversing lever and said second anchor.

14. The sliding door of claim 5, wherein said force-controlled mechanism is pivotally mounted about a pivoting axis and includes an actuating cam for pivoting the force-controlled mechanism in response to an interaction between the sliding door and said actuating cam.

15. The sliding door of claim 5, wherein said force-controlled mechanism comprises a spring-loaded engaging and disengaging lever connected to said second anchor by a rocking leven, said spring-loaded engaging and disengaging lever operable in response to interaction with the door for moving said second anchor into and out of the side panel.

16. The sliding door of claim 7, wherein said force-controlled mechanism comprises one of a cable, a Bowden cable, or a sliding rod operable in response to said reversing lever for moving said second anchor into and out of the side panel.

17. The sliding door of claim 7, wherein said force-controlled mechanism comprises one of a concealed lever connection or an eccentric adjustment operable in response to said reversing lever for moving said second anchor into and out of the side panel.

18. The sliding door of claim 7, wherein said force-controlled mechanism comprises a gear drive arranged between said reversing lever and said second anchor.

19. The sliding door of claim 7, wherein said force-controlled mechanism is pivotally mounted about a pivoting axis and includes an actuating cam for pivoting the force-controlled mechanism in response to an interaction between the sliding door and said actuating cam.

20. The sliding door of claim 7, wherein said force controlled mechanism comprises a spring-loaded engaging and disengaging lever connected to said second anchor by a rocking lever, said spring-loaded engaging and disengaging lever operable in response to interaction with the door for moving said second anchor into and out of the side panel.

21. The sliding door of claim 1, wherein said first anchor comprises a stopping lever hingably-mounted on said carriage and said second anchor comprises a slot or opening defined in the side panel, wherein said stopping lever engages said slot or opening when the door reaches the opening position.

22. The sliding door of claim 1, wherein said first anchor comprises a stopping lever arranged on said reversing lever and said second anchor comprises a slot or opening defined in the side panel, wherein said stopping lever engages said slot or opening when the door reaches the opening position.

23. The sliding door of claim 1, wherein said carriage is pivotally mounted on said reversing lever by an oblong hole defined in said carriage, said first anchor comprising a stopping lever arranged on said carriage and said second anchor comprises a slot or opening defined in the side panel, wherein said stopping lever engages said slot or opening when the door reaches the opening position.

* * * * *